Aug. 15, 1944. C. A. VAN DERVEER 2,355,762
CHAIR OR SEAT
Original Filed June 17, 1938 2 Sheets-Sheet 2
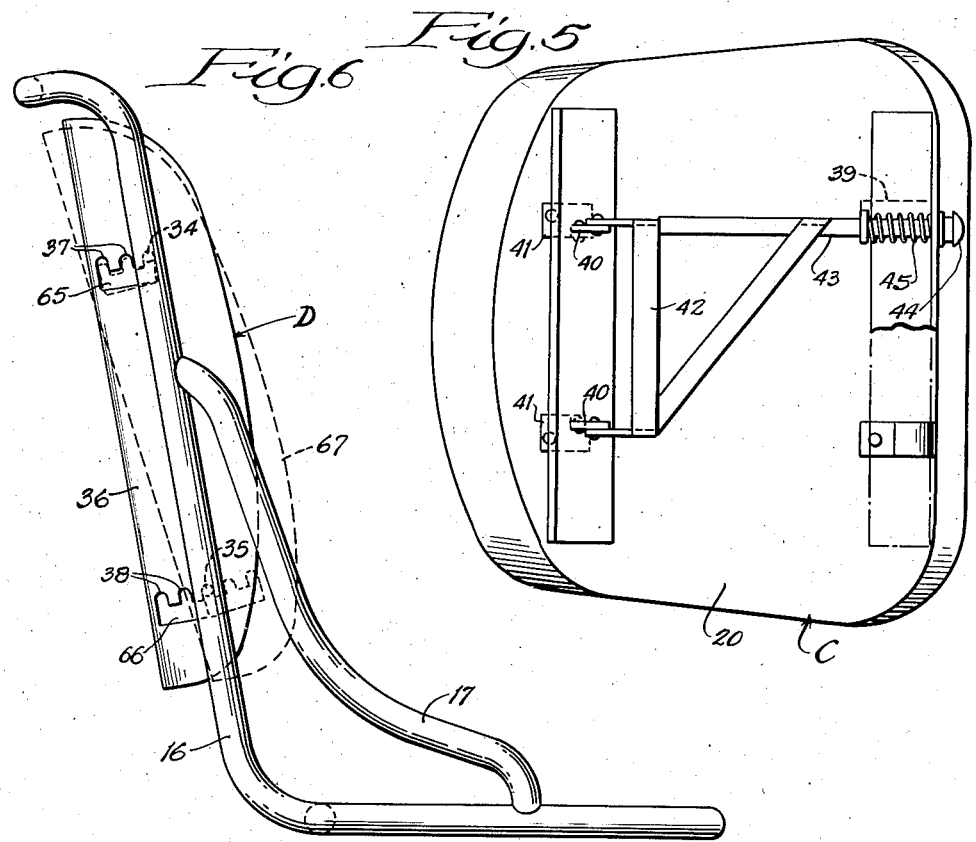
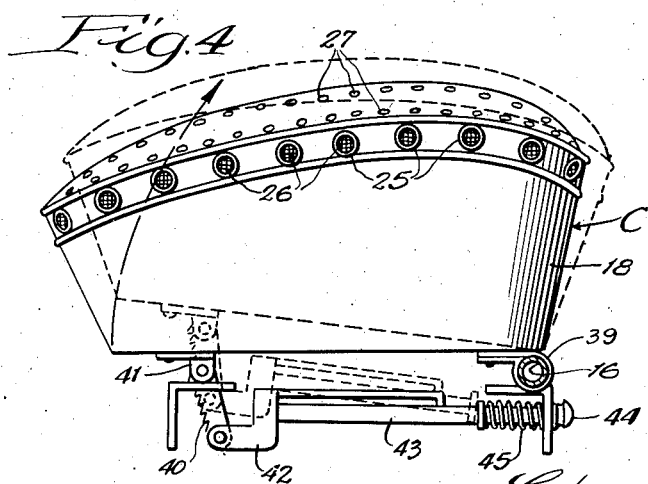
Inventor:
Clarence A. Van Derveer,
By Dawson, Cous and Booth
Attorneys.

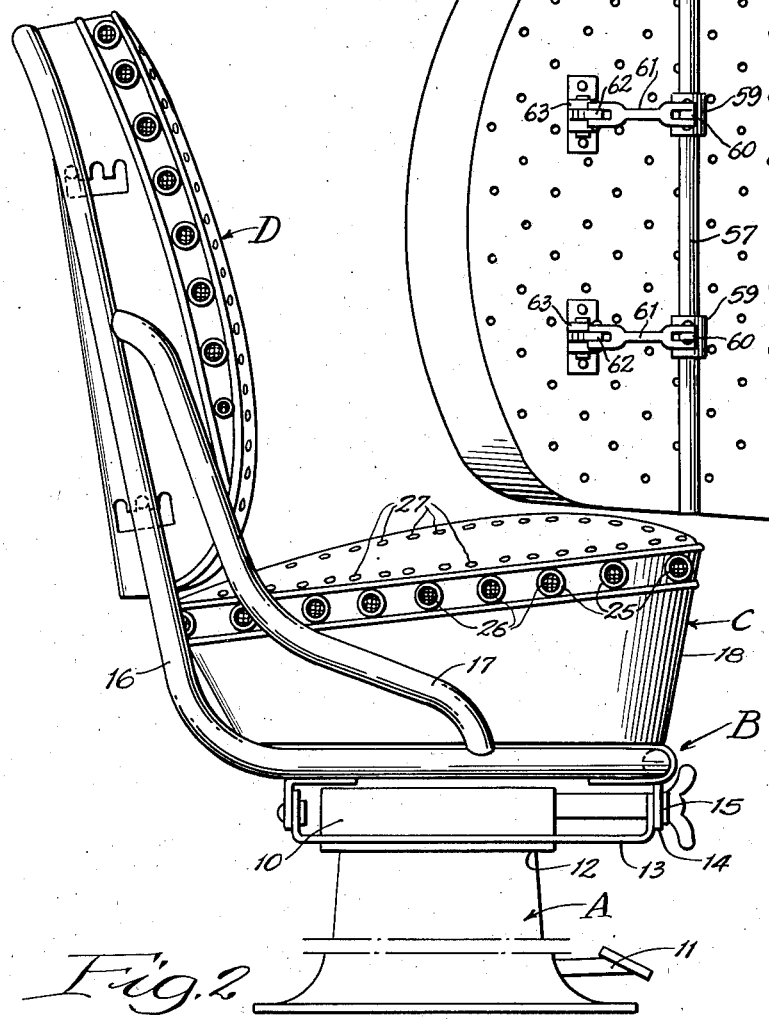
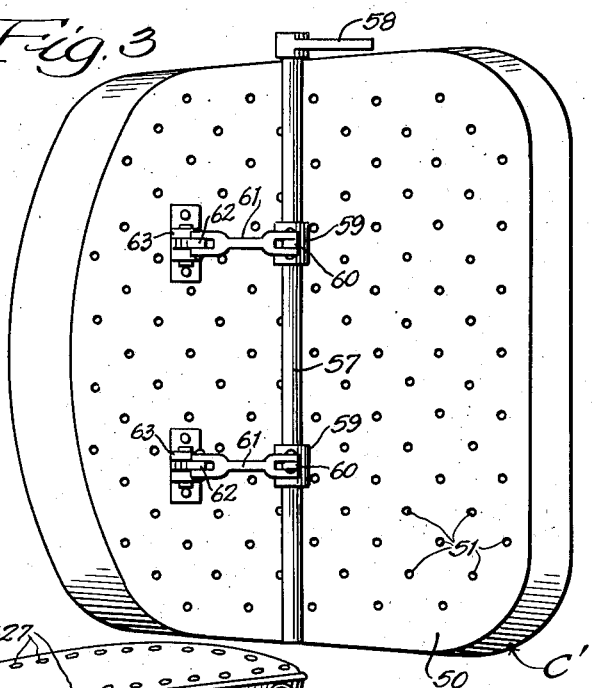
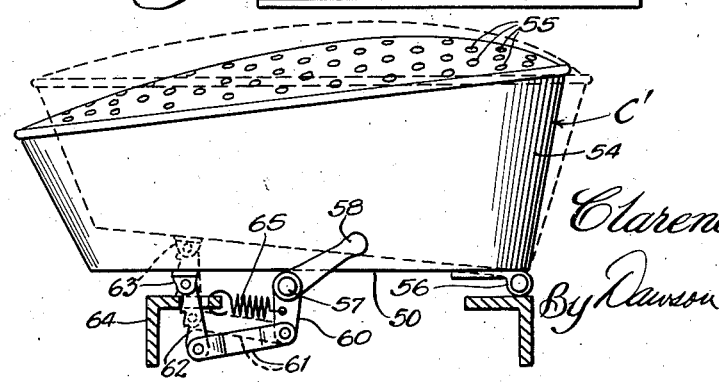

Patented Aug. 15, 1944

2,355,762

UNITED STATES PATENT OFFICE 2,355,762

CHAIR OR SEAT

Clarence A. Van Derveer, Chicago, Ill., assignor to S. Karpen & Bros., Chicago, Ill., a corporation of Illinois Original application June 17, 1938, Serial No. 214,320. Divided and this application July 26, 1941, Serial No. 404,100

2 Claims. (Cl. 155—120)

This invention relates to a chair or seat. It is particularly useful as a driver's seat in buses and other vehicles. The seat is also adapted for passengers in vehicles, for auditoriums, and for many other uses.

An object of the invention is to provide a seat cushion, either the back or the seat thereof, with simple and effective structure whereby the seat is maintained more comfortable, cool, and whereby the same is kept ventilated. A further object is to provide a chair cushion, including the back or seat thereof, which is equipped with self-ventilating means and which is provided with a top or front structure which maintains the same cool. A further object is to provide a chair cushion which is rotatable and adjustable, with respect to both the back cushion and the seat cushion. A further object is to provide an adjustable driver's seat which is adjustable vertically and in which the cushions of the seat and the back are adjustable, the back and seat being equipped with ventilating and cooling means.

Another object of the invention is to provide a back cushion member in a seat which is independently horizontally adjustable at the upper and lower portions thereof and to provide a seat cushion which is pivotally mounted at the forward end thereof and is easily and readily adjusted vertically at the rear end thereof. Other specific objects and advantages will appear as the specification proceeds.

The invention is illustrated, in a preferred embodiment, by the accompanying drawings, in which—

Figure 1 is a side view in elevation of a seat embodying the invention; Fig. 2 is a detail side elevational view of an embodiment of the invention; Fig. 3 is a bottom plan view of the seat cushion shown in Fig. 2; Fig. 4 is a detail side elevational view of a seat cushion in another embodiment of the invention; Fig. 5 is a bottom plan view of the embodiment shown in Fig. 4; and Fig. 6 is a side elevational view of an adjustable back cushion supported on the frame.

In the invention shown in Fig. 1, A designates a base structure; B, a frame rotatably supported upon the base; C, the seat cushion and D, the back cushion.

The base A may be of any suitable construction. It includes means for vertically raising the collar 10 which is carried by the base, the raising and lowering being effected by the foot pedal 11. In view of the fact that this is a well known construction, a detailed description will not be given. The collar 10 is provided with a flange 12 which receives the bracket support 13. The frame B is equipped with depending straps 14 secured to the member 13 and by means of which the frame B is supported upon flange 12. A screw member 15, equipped with a wing nut, is employed for preventing rotation of the member 13. In this structure, the front end of the screw member 15 engages the member 10 and thereby maintains the frame in fixed position.

The frame B may be of any suitable construction. In the illustration given it consists of a tubing member 16 bent in the shape illustrated in Figs. 1 and 6, the frame being braced by the arm tubes 17 on each side of the chair.

The seat cushion C, as seen in the embodiment shown in Figs. 4 and 5, may be of any suitable construction. The cushion may include a suitable rigid base 29 and a resilient material carried thereby, the entire cushion assembly being covered by fabric 18. The casing or fabric 18 is provided near its top with a plurality of ventilator openings 25, a ventilator screen 26 being employed in each opening. The casing is also provided at its top surface with a large number of minute ventilation openings 27. With this type of construction, it is found that the vibrations of the car or machine in which the seat is used and the bouncing movement of the driver on the cushion causes air to be drawn in through the ventilator openings or vents 25 and to be expelled through the small holes 27 in the top of the cushion. This construction is described in detail and claimed in my copending application, Serial No. 214,320, and will not be described in detail herein.

The seat cushion C is adjustably supported on the frame B so that the rear portion of the cushion may be raised or lowered at will. As seen in the embodiment of the invention shown in Figs. 4 and 5, the bottom of the member C is provided with a pair of straps 39 which receive the forward end of the top frame 16 and hingedly support the front part of the cushion C upon the frame 16.

The depending strap member 14 at the rear of frame 16 has a horizontal frame provided with a pair of spaced slots through which extends two rack members 40, the rack members 40 being pivotally connected by links 41 to the bottom of the member C. The lower end of each of the toothed members 40 is pivotally connected to a frame member 42 which is provided at its forward end with a draw bar 43. Bar 43 extends through the front strap member 14 and is equipped with a knob 44. A spring 45 is compressed between the flange 14 and the flange 46 carried by the bar 43, thus urging the frame member 42 rearwardly and the two toothed bars 40 into engagement with the horizontal flange of member 14. Thus, to release the rear portion of the seat, the latch part may be drawn forwardly and then when the seat has been elevated to the desired position, the bar 43 may be released and the spring 45 will urge the toothed bars 40 into locking position whereby the seat will be maintained in such elevated position.

The back cushion D is also adjustably supported upon the frame 16. As seen particularly in Fig. 6, the frame includes a pair of vertical standards which extend upwardly adjacent the opposed sides of the back cushion D. Each of the standards is equipped with a pair of pins 34 and 35 at the upper and lower portions thereof respectively. The side walls of the member D are provided with slotted plates 36 which contain a plurality of vertical slots 37 in the upper portion thereof and a similar group of vertical slots 38 in the lower portion thereof. The vertical slots 37 are spaced from each other, as are the vertical slots 38. The slots 37, however, communicate with the horizontal slot 65, while the slots 38 communicate with the horizontal slot 66. The pins 34 and 35 are received within the vertical slots 37 and 38 respectively and serve to support the back cushion D.

The plate 36 thus engages the pins 34 and 35 in locking and supporting relation and fixes the horizontal position of the cushion as well as supports the same.

The other side of the back cushion D is similarly equipped with a plate and slots which receive pins carried by the frame. Since this construction is exactly the same as that described in connection with the plate 36, it will not be described in detail herein.

The seat cushion C may be readily adjusted to the desired position by drawing the plunger knob 44 forwardly to release the ratchet 40 from plate 14 and then elevate the rear portion of the seat to the desired position, after which the knob 44 is released. In this movement, the front portion of the seat swings about the frame member 16 and the spring 45 locks the ratchet bar 40 against plate 14.

The back cushion D may readily be adjusted in position by merely lifting the cushion until the pins 34 and 35 are received in the horizontal slots 65 and 66. The upper and lower portions of the cushions may then be moved in a horizontal plane to change the position of the cushion as indicated at 67 in the dotted outline of Fig. 6. By this means, when the cushion is raised it may be included in any desired position so that when released it will bring the pins into engagement with the adjacent vertical slots and fix the position of the cushion.

In the embodiment of the invention illustrated in Figs. 2 and 3, the cushion C' is provided with a laminated board base 50 which is equipped with small spaced perforations 51. Above the base a suitable resilient material may be arranged within the casing or cover 54. The upper surface of the casing or cover 54 may be provided with a plurality of ventilation openings 55. This construction is described in detail and claimed in my copending application, Serial No. 214,320, and will not be described in detail herein.

The seat base C' is pivotally supported upon the front frame bar 16 by means of a hinge member 56. For raising and lowering the rear portion of the seat C', I provide very simple and effective means consisting of a central shaft 57 equipped at one end with an operating lever 58 rigidly secured thereto. At intermediate points, the shaft 57 has fixed thereto collar members 59 provided with actuating arms 60. Each of the actuating arms 60 engages one of the operating links 61 which is at its other end pivotally connected to a latch bar 62. Each of the latch bars 62 is pivotally connected to the base of the seat at 63. The latch bar 62 is adapted to engage a portion of the frame 64.

In the operation of the adjusting mechanism, when the lever 58 is swung upwardly, the latch bar 62 is drawn forwardly against the tension of spring 65 which connects frame 64 and arm 60, thus permitting the latch bar to clear the portion of frame 64 engaged by it. The seat may then be raised or lowered to the desired position, the front part of the seat swinging about the pivot bar 16. When handle 58 is released, spring 65 brings the latch bar 62 into engagement with frame 64 and thus locks the seat in the position at which it is held.

This application is a division of my copending application, Serial No. 214,320, filed June 17, 1938, for Chair or seat.

While in the foregoing description, I have set forth a detailed description of the device as now made, it will be understood that no attempt is made to set forth the various details and modifications which will at once occur to those skilled in the art, it being understood that such variations may be readily made without departing from the spirit of my invention.

I claim:

1. An adjustable seat, comprising a frame, a seat cushion having its front portion pivotally mounted upon the frame, a pair of spaced ratchet bars pivotally mounted at the upper ends thereof on the cushion at the rear end of the same and depending therefrom, said bars being in adjacent relation to a portion of the frame whereby the teeth on said bars may be brought into locking engagement with the frame in various positions to adjustably support the rear portion of the cushion on the frame, spring means for urging the ratchet bars into engagement with the frame, the teeth of the ratchet bars extending downwardly and laterally and having the upper surfaces thereof inclined downwardly whereby the ratchet bars may be moved upwardly but not downwardly with respect to the frame and against the urging of the spring when pressure for vertical movement is exerted on the rear portion of the cushion, a shaft rotatably mounted on the bottom of the cushion, a lever fixedly mounted on said shaft and extending downwardly therefrom, link members pivotally connecting the lower end of said lever with the lower ends of the ratchet bars whereby movement of said lever draws the ratchet bars from engagement with the frame to permit downward movement of the rear end of the cushion, and a manually-operable lever for rotating the shaft.

2. An adjustable seat, comprising a frame, a seat cushion having its front portion pivotally mounted upon the frame, a pair of spaced ratchet members pivotally mounted at the upper ends thereof on the rear end of the cushion and depending therefrom, each of said members being received for vertical movement within an aperture in the frame and being in adjacent relation to a portion of the frame whereby the teeth of said members may be brought into locking engagement with the frame in various positions to adjustably support the rear portion of the cushion on the frame, spring means for urging the ratchet members into locking engagement with the frame, the teeth of the ratchet members being angularly inclined with respect to the portion of the frame engaged thereby whereby the members may be moved upwardly but not downwardly with respect to the frame and against the urging of the spring when pressure for vertical movement is exerted on the rear portion of the cushion, link members pivotally mounted at the lower ends of the ratchet members, and manually-operable lever means secured to said link members for drawing the ratchet members from engagement with the frame to permit downward movement of the rear end of the cushion.

CLARENCE A. VAN DERVEER.